(12) United States Patent
Sant et al.

(10) Patent No.: US 10,968,142 B2
(45) Date of Patent: Apr. 6, 2021

(54) ENHANCED CARBONATION AND CARBON SEQUESTRATION IN CEMENTITIOUS BINDERS

(71) Applicant: THE REGENTS OF THE UNIVERSITY OF CALIFORNIA, Oakland, CA (US)

(72) Inventors: Gaurav Sant, Los Angeles, CA (US); Kirk E. Vance, Beverly Hills, CA (US); Magdalena Balonis, Los Angeles, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 339 days.

(21) Appl. No.: 15/519,524

(22) PCT Filed: Oct. 14, 2015

(86) PCT No.: PCT/US2015/055564
§ 371 (c)(1),
(2) Date: Apr. 14, 2017

(87) PCT Pub. No.: WO2016/061251
PCT Pub. Date: Apr. 21, 2016

(65) Prior Publication Data
US 2017/0226021 A1  Aug. 10, 2017

Related U.S. Application Data

(60) Provisional application No. 62/064,388, filed on Oct. 15, 2014.

(51) Int. Cl.
*C04B 40/02* (2006.01)
*B28B 11/24* (2006.01)
(Continued)

(52) U.S. Cl.
CPC ........ *C04B 40/0231* (2013.01); *B28B 11/245* (2013.01); *C04B 28/04* (2013.01);
(Continued)

(58) Field of Classification Search
CPC ....... C04B 28/04; C04B 28/06; C04B 28/105; C04B 28/10; C04B 28/065; C04B 40/0231; B28B 11/245
See application file for complete search history.

(56) References Cited

U.S. PATENT DOCUMENTS 4,318,996 A * 3/1982 Magder ............... C04B 38/02
264/42
4,379,870 A * 4/1983 Matsumoto ............ B29C 70/20
524/8

(Continued)

FOREIGN PATENT DOCUMENTS

WO    WO-2014/009802 A2    1/2014

OTHER PUBLICATIONS

International Search Report and Written Opinion for International Application No. PCT/US2015/055564 dated Jan. 22, 2016, 13 pages.

*Primary Examiner* — Nahida Sultana
(74) *Attorney, Agent, or Firm* — Foley & Lardner LLP

(57) ABSTRACT

A manufacturing process of a cement product includes: (a) reacting at least one anhydrous or hydrated cement component with liquid or supercritical $CO_2$ to form a cement composition; and (b) curing the cement composition to form a cement product.

16 Claims, 6 Drawing Sheets

(51) Int. Cl.
*C04B 28/04* (2006.01)
*C04B 28/06* (2006.01)
*C04B 28/10* (2006.01)

(52) U.S. Cl.
CPC ............ *C04B 28/06* (2013.01); *C04B 28/065* (2013.01); *C04B 28/10* (2013.01); *C04B 28/105* (2013.01); *Y02P 40/18* (2015.11)

(56) References Cited

U.S. PATENT DOCUMENTS

| | | | | |
|---|---|---|---|---|
| 4,432,666 | A * | 2/1984 | Frey | B09B 1/00 588/257 |
| 4,452,635 | A * | 6/1984 | Noshi | C04B 12/04 106/628 |
| 4,828,620 | A * | 5/1989 | Mallow | C04B 7/425 106/738 |
| 5,518,540 | A | 5/1996 | Jones, Jr. | |
| 5,744,078 | A * | 4/1998 | Soroushian | C04B 40/0231 264/82 |
| 6,264,736 | B1 * | 7/2001 | Knopf | C04B 40/0231 106/682 |
| 6,569,923 | B1 * | 5/2003 | Slagter | C04B 28/04 106/696 |
| 8,333,944 | B2 * | 12/2012 | Constantz | B01D 53/1475 423/225 |
| 2001/0023655 | A1 * | 9/2001 | Knopf | C04B 40/0231 106/792 |
| 2002/0168473 | A1 * | 11/2002 | Ottersbach | B27K 3/15 427/337 |
| 2004/0077787 | A1 * | 4/2004 | Karande | C08L 23/08 525/88 |
| 2005/0238563 | A1 | 10/2005 | Eighmy et al. | |
| 2008/0156232 | A1 * | 7/2008 | Crudden | C04B 28/14 106/725 |
| 2008/0245274 | A1 | 10/2008 | Ramme | |
| 2010/0251632 | A1 * | 10/2010 | Chen | B28B 3/26 52/95 |
| 2011/0067600 | A1 * | 3/2011 | Constantz | B01D 53/62 106/640 |
| 2011/0290155 | A1 * | 12/2011 | Vlasopoulos | C04B 22/066 106/801 |
| 2012/0082839 | A1 * | 4/2012 | Ha | E01C 5/06 428/221 |
| 2014/0097557 | A1 * | 4/2014 | Alhozaimy | C04B 28/04 264/333 |
| 2014/0197563 | A1 * | 7/2014 | Niven | B28B 1/08 264/69 |
| 2018/0238157 | A1 * | 8/2018 | Fu | E21B 43/164 |
| 2019/0177220 | A1 * | 6/2019 | Sant | C04B 7/38 |

* cited by examiner

ENHANCED CARBONATION AND CARBON SEQUESTRATION IN CEMENTITIOUS BINDERS

CROSS-REFERENCE TO RELATED APPLICATION

This application is a National Stage Entry of International Application No. PCT/US2015/055564, filed Oct. 14, 2015, which claims the benefit of U.S. Provisional Application No. 62/064,388, filed Oct. 15, 2014, the contents of which are incorporated herein by reference in their entirety.

STATEMENT REGARDING FEDERALLY SPONSORED RESEARCH OR DEVELOPMENT

This invention was made with Government support under Grant Nos. 1401533 and 1253269, awarded by the National Science Foundation. The Government has certain rights in the invention.

TECHNICAL FIELD

This disclosure relates to carbonation and carbon sequestration in cement components for use as cementitious binders.

BACKGROUND

The production of ordinary portland cement (OPC), the binder used in concrete, releases a significant amount of carbon dioxide ($CO_2$) into the atmosphere, both as a result of energy requirements and as a result of a calcination process in a kiln. Over time, hydration products of OPC can undergo carbonation, a process under which gaseous $CO_2$ in the atmosphere reacts with the hydration products to form carbonates. This process removes some atmospheric $CO_2$. However, carbonation by gaseous $CO_2$ can be slow, and a hardened concrete generally does not allow for $CO_2$ to effectively diffuse into the concrete; thus, carbonation is generally constrained to a near-surface volume of the hardened concrete, constraining the sequestration ability of the concrete.

It is against this background that a need arose to develop embodiments of this disclosure.

SUMMARY

One aspect of some embodiments of this disclosure relates to a manufacturing process of a cement product, which process includes: (a) reacting at least one anhydrous or hydrated cement component with liquid or supercritical $CO_2$ to form a cement composition; and (b) curing the cement composition to form a cement product.

In some embodiments, the at least one cement component includes at least one of portlandite, tricalcium silicate, dicalcium silicate, and calcium silicate hydrate.

In some embodiments, the at least one cement component includes at least one of magnesium hydroxide and magnesium silicate.

In some embodiments, the at least one cement component includes at least two different cement components.

In some embodiments, the reacting in (a) includes forming calcium carbonate.

In some embodiments, the cement composition includes an amount of calcium carbonate that is at least about 3% by mass.

In some embodiments, the reacting in (a) includes forming magnesium carbonate.

In some embodiments, the cement composition includes an amount of magnesium carbonate that is at least about 3% by mass.

In some embodiments, the reacting in (a) is carried out at a temperature in a range of 0° C. to about 60° C.

In some embodiments, the reacting in (a) is carried out at a pressure at or above about 0.51 MPa.

In some embodiments, the process further includes conditioning the at least one cement component in an atmosphere with a relative humidity greater than about 8%, prior to the reacting in (a).

Another aspect of some embodiments of this disclosure relates to a manufacturing process of a cement product, which process includes: (a) combining at least one cement component with aggregates; and (b) exposing the at least one cement component and the aggregates to liquid or supercritical $CO_2$ to form a cement product. In some embodiments, the exposing in (b) yields cementation to form a concrete product including a cemented mixture of the at least one cement component and the aggregates.

In some embodiments, the at least one cement component includes portlandite or calcium silicate hydrate.

In some embodiments, the at least one cement component is ordinary portland cement, a calcium sulfoaluminate cement, or a calcium aluminate cement.

In some embodiments, the at least one cement component includes magnesium hydroxide or magnesium silicate.

In some embodiments, the exposing in (b) is carried out at a temperature in a range of 0° C. to about 60° C., and a pressure in a range of about 0.51 MPa to about 20 MPa.

In some embodiments, the exposing in (b) includes converting the at least one cement component to calcium carbonate.

In some embodiments, the exposing in (b) includes converting the at least one cement component to magnesium carbonate.

In some embodiments, a mass basis percentage of the at least one cement component converted to calcium carbonate or magnesium carbonate is at least about 10% within a reaction time period of about 6 h.

A further aspect of some embodiments of this disclosure relates to a manufacturing process, which includes: (a) disposing a reactant in a reactor, wherein the reactant corresponds to portlandite; (b) introducing liquid or supercritical $CO_2$ into the reactor; and (c) exposing the reactant to the liquid or supercritical $CO_2$ for a reaction time period to form calcium carbonate.

In some embodiments, a water content of the reactant is no greater than about 25% by mass.

In some embodiments, the reactant is in a powder form, or in a monolithic form.

In some embodiments, a mass basis percentage of the reactant converted to calcium carbonate is at least about 10% within the reaction time period of about 6 h.

In some embodiments, the reactant consists of, or consists essentially of, portlandite.

In some embodiments, the reactant is composed of portlandite in an amount of at least about 80% by mass, at least about 85% by mass, at least about 90% by mass, or at least about 95% by mass.

A further aspect of some embodiments of this disclosure relates to a manufacturing process, which includes: (a) disposing a reactant in a reactor, wherein the reactant corresponds to magnesium hydroxide or magnesium silicate; (b) introducing liquid or supercritical $CO_2$ into the reactor; and (c) exposing the reactant to the liquid or supercritical $CO_2$ for a reaction time period to form magnesium carbonate.

In some embodiments, a water content of the reactant is no greater than about 25% by mass.

In some embodiments, the reactant is in a powder form, or in a monolithic form.

In some embodiments, a mass basis percentage of the reactant converted to magnesium carbonate is at least about 10% within the reaction time period of about 6 h.

In some embodiments, the reactant consists of, or consists essentially of, magnesium hydroxide.

In some embodiments, the reactant consists of, or consists essentially of, magnesium silicate.

In some embodiments, the reactant is composed of magnesium hydroxide in an amount of at least about 80% by mass, at least about 85% by mass, at least about 90% by mass, or at least about 95% by mass.

In some embodiments, the reactant is composed of magnesium silicate in an amount of at least about 80% by mass, at least about 85% by mass, at least about 90% by mass, or at least about 95% by mass.

Other aspects and embodiments of this disclosure are also contemplated. The foregoing summary and the following detailed description are not meant to restrict this disclosure to any particular embodiment but are merely meant to describe some embodiments of this disclosure.

BRIEF DESCRIPTION OF THE DRAWINGS

For a better understanding of the nature and objects of some embodiments of this disclosure, reference should be made to the following detailed description taken in conjunction with the accompanying drawings.

DETAILED DESCRIPTION

Figure 1:
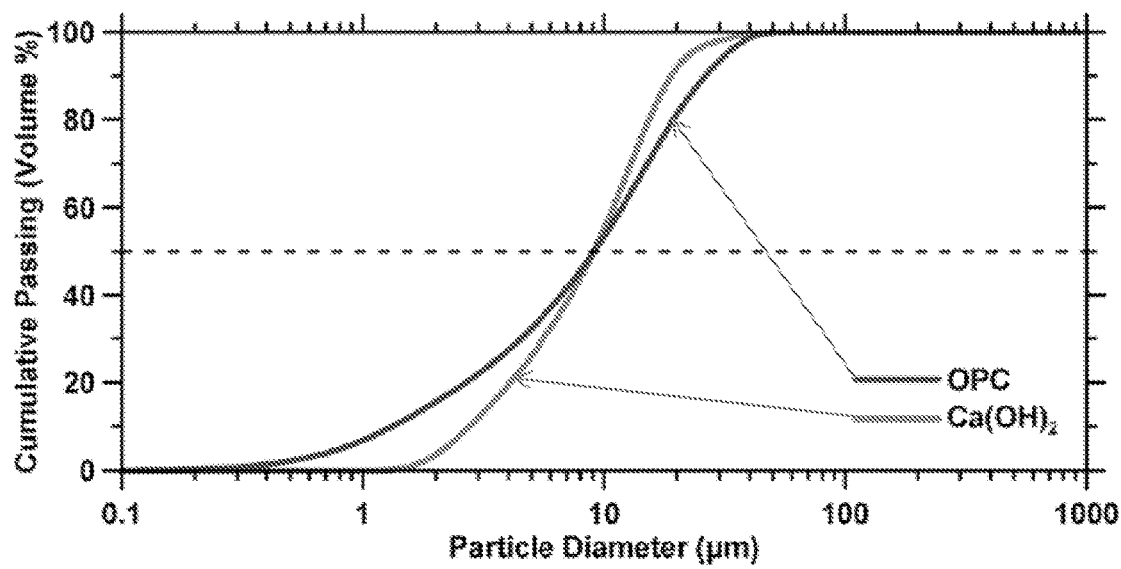
FIG. 1. Particle size distributions of $Ca(OH)_2$ and ordinary portland cement (OPC) as determined using static light scattering (SLS). The highest uncertainty in the SLS measurements is ±6%.

Embodiments of this disclosure provide an improved carbonation process by mixing, reacting, or otherwise combining one or more anhydrous or hydrated cement components (or cement constituents) with liquid or supercritical carbon dioxide (CO$_2$), allowing their direct carbonation. In some embodiments, this reaction generates limestone (calcium carbonate or CaCO$_3$), along with silica (SiO$_2$) for some embodiments, for use as a binder in a cement product, and significantly increases the sequestration ability of the resulting cement product, effectively capturing CO$_2$ over a substantial volume of the binder or cement product. In contrast to carbonation in gaseous CO$_2$, the interaction of cement components with CO$_2$ in liquid or supercritical states allows for significantly accelerated conversion to CaCO$_3$.

In some embodiments, specific cement components, such as portlandite (Ca(OH)$_2$), tricalcium silicate (Ca$_3$SiO$_5$), dicalcium silicate (Ca$_2$SiO$_4$), calcium silicate hydrate, or a combination of two or more of such cement components, are reacted with liquid or supercritical CO$_2$ in a reactor to form a cement composition including calcium carbonate along with one or more additional reaction products. Tricalcium silicate also can be represented as 3CaO.SiO$_2$, and as C$_3$S in cement chemist notation, and dicalcium silicate also can be represented as 2CaO.SiO$_2$, and as C$_2$S in cement chemist notation. Calcium silicate hydrate can be represented as xCaO.SiO$_2$.yH$_2$O, and as C—S—H in cement chemist notation, and corresponds to one or more phases resulting from hydration of OPC. In some embodiments, liquid CO$_2$ is a fluid state of CO$_2$ when it is held or pressurized, such as above about 5.1 atm (or above about 0.51 MPa), and supercritical CO$_2$ is a fluid state of CO$_2$ when it is held at or above its critical temperature and critical pressure, such as at or above about 304.25 K (or about 31.1° C.) and at or above about 71.9 atm (or at or above about 7.29 MPa).

For example, the reaction of Ca(OH)$_2$ with liquid or supercritical CO$_2$ can be represented by eq 1 below:

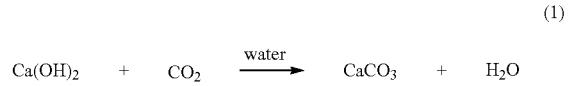

$$Ca(OH)_2 + CO_2 \xrightarrow{water} CaCO_3 + H_2O \quad (1)$$

As another example, in the case of tricalcium silicate and dicalcium silicate, the reactions can proceed according to eqs 2 and 3 below:

$$Ca_3SiO_5 + 3CO_{2(l,sc)} \xrightarrow{water} 3CaCO_3 + SiO_{2(am)} \quad (2)$$

$$Ca_2SiO_4 + 2CO_{2(l,sc)} \xrightarrow{water} 2CaCO_3 + SiO_{2(am)} \quad (3)$$

In eqs 2 and 3, the subscripts "l", "sc", and "am" denote the liquid or supercritical states and amorphous nature, respectively. Similar reaction pathways can be applicable for other cement components, such as calcium aluminates like Ca$_3$Al$_2$O$_6$ (or 3CaO.Al$_2$O$_3$ or C$_3$A), calcium aluminoferrites like Ca$_4$Al$_2$Fe$_2$O$_{10}$ (or (CaO)$_4$Al$_2$O$_3$Fe$_2$O$_3$ or C$_4$AF), other calcium-containing cement components, other silicon-containing cement components, other magnesium-containing cement components, and other cement components present in OPC, calcium sulfoaluminate cements (CSAs) or calcium aluminate cements (CACs). For example, magnesium-containing cement components, such as magnesium hydroxide and magnesium silicate, can be reacted with liquid or supercritical CO$_2$ to form magnesium carbonate (MgCO$_3$).

In some embodiments, beyond adsorbed water on reactants and any water present in a reactor, the carbonation reaction of cement components can proceed without additionally added water, such as where the cement components are substantially anhydrous. For example, a water content of a cement component as a reactant (or a combination of cement components as reactants) can be no greater than about 25% by mass or weight, no greater than about 20% by mass or weight, no greater than about 15% by mass or weight, no greater than about 10% by mass or weight, no greater than about 8% by mass or weight, no greater than about 5% by mass or weight, no greater than about 3% by mass or weight, no greater than about 2% by mass or weight, or no greater than about 1% by mass or weight, and down to about 0.1% by mass or weight or less. In some embodiments, cement components can be conditioned (prior to the carbonation reaction) in an atmosphere with a relative humidity greater than about 8%, such as about 30% or greater, about 50% or greater, about 75% or greater, or about 90% or greater, for a time period in a range of about 1 to about 10 days or about 3 to about 10 days, to yield a desired content of adsorbed water on the cement components.

Cement components of some embodiments can be reacted in a powder or particulate form. Such powder or particulate form can promote a rate and an extent of the reaction through greater specific surface area and associated interface effects. For example, a volume median size of a particulate cement component as a reactant (or a combination of cement components as reactants) can be no greater than about 500 μm, no greater than about 200 μm, no greater than about 100 μm, no greater than about 80 μm, no greater than about 60 μm, no greater than about 40 μm, no greater than about 20 μm, or no greater than about 10 μm, and down to about 1 μm or less. As another example, a specific surface area of a cement component as a reactant (or a combination of cement components as reactants) can be about 100 m$^2$·kg$^{-1}$ or greater, about 200 m$^2$·kg$^{-1}$ or greater, about 300 m$^2$·kg$^{-1}$ or greater, about 400 m$^2$·kg$^{-1}$ or greater, about 500 m$^2$·kg$^{-1}$ or greater, or about 600 m$^2$·kg$^{-1}$ or greater, and up to about 800 m$^2$·kg$^{-1}$ or greater.

Figure 11:
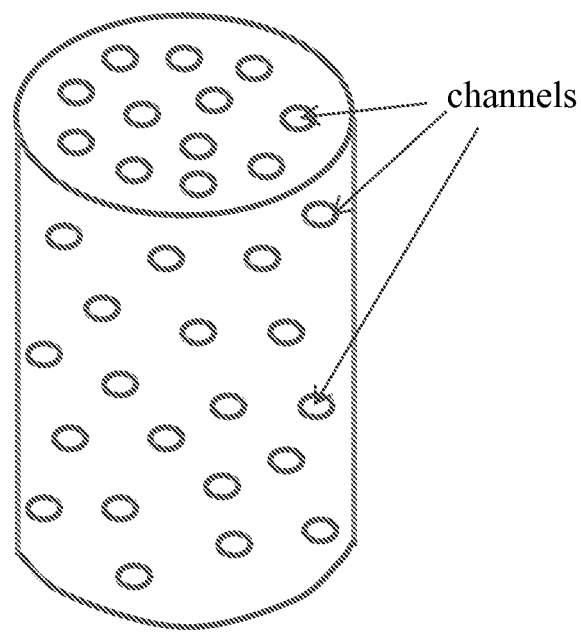
FIG. 11. A monolithic cement component shaped with channels or pores to facilitate permeation of CO$_2$.

Cement components of other embodiments can be reacted in a monolithic form. For example, a cement component (or a combination of cement components) can be subjected to casting, molding, pressing, 3D printing, or otherwise shaped to form a structural element, and the structural element can be exposed to and reacted with liquid or supercritical CO$_2$. In some embodiments, a monolithic cement component can be shaped with channels or pores to facilitate permeation of CO$_2$ through the channels and thereby promote a rate and an extent of carbonation (see FIG. 11).

In some embodiments, cement components can be reacted in their uncured (e.g., anhydrous or non-hydrated) forms. In other embodiments, cement components can be reacted in their cured (e.g., hydrated) forms, such as in the case of calcium silicate hydrate. A cement component can be reacted as a single reactant, substantially devoid of other cement components, or a mixture of two or more cement components can be reacted as reactants in combination. For example, OPC, which typically includes a mixture of cement components such as tricalcium silicate, dicalcium silicate, tricalcium aluminate, and tetracalcium aluminoferrite, can be reacted with liquid or supercritical $CO_2$. OPC can be classified to different types according to ASTM C150, including Type I, Type II, Type III, Type IV, and Type V. Examples of other cements that can be reacted include CSAs and CACs.

In some embodiments, a $CO_2$-to-reactant(s) ratio (volume basis) in the carbonation reaction can be at least about 1:1, such as about 1.5:1 or greater, about 2:1 or greater, about 5:1 or greater, about 10:1 or greater, about 15:1 or greater, about 20:1 or greater, or about 25:1 or greater, and up to about 50:1 or greater.

In some embodiments, a purity of $CO_2$ can be about 70% or greater (volume basis), such as about 75% or greater, about 80% or greater, about 85% or greater, about 90% or greater, about 95% or greater, about 98% or greater, or about 99% or greater, although a purity level of $CO_2$ less than about 70% is also encompassed by this disclosure.

In some embodiments, $CO_2$ in a liquid state or a supercritical state can react with a cement component (or a combination of cement components) in a reactor maintained at or near ambient temperatures, such as from about $-10°$ C. to about $80°$ C., from about $0°$ C. to about $60°$ C., from about $5°$ C. to about $55°$ C., from about $10°$ C. to about $50°$ C., from about $8°$ C. to about $42°$ C., from about $15°$ C. to about $45°$ C., or from about $20°$ C. to about $40°$ C., and pressurized at or above about 0.51 MPa, such as from about 0.51 MPa to about 20 MPa, from about 1 MPa to about 15 MPa, from about 3 MPa to about 15 MPa, from about 5 MPa to about 15 MPa, or from about 6 MPa to about 10 MPa. The carbonation reaction can be rapid, such as where a percentage (mass basis) of a cement component (or a combination of cement components) consumed or converted to reaction products can be at least about 10%, at least about 20%, at least about 30%, at least about 40%, at least about 50%, at least about 60%, or at least about 80%, and up to about 90%, up to about 95%, or more, within a reaction time period of about 6 h, such as within about 5.5 h, within about 5 h, within about 4.5 h, within about 4 h, within about 3.5 h, within about 3 h, within about 2.5 h, or within about 2 h. In some embodiments, $CO_2$ in a solid state (dry ice) can be used in place of, or in combination with, $CO_2$ in a liquid state or a supercritical state. For example, solid $CO_2$ can sublimate to a gaseous state at or near ambient conditions, and, when disposed in a reactor along with a cement component (or a combination of cement components), the sublimation of $CO_2$ to its gaseous state can result in an increase in partial pressure of $CO_2$ within the reactor, leading to accelerated carbonation.

In some embodiments, the reaction of a cement component (or a combination of cement components) with liquid or supercritical $CO_2$ is carried out, such that a resulting cement composition includes an amount of calcium carbonate (or magnesium carbonate) that is at least about 3% by mass or weight, such as at least about 5%, at least about 10%, at least about 15%, at least about 20%, at least about 25%, at least about 30%, or at least about 35%, and up to about 40% or more, up to about 45% or more, or up to about 50% or more. In some embodiments, the reaction of a cement component (or a combination of cement components) with liquid or supercritical $CO_2$ is carried out, such that a resulting cement composition includes an amount of calcium carbonate (or magnesium carbonate) (mass basis) that is at least about 1.1× an initial amount of calcium carbonate (or magnesium carbonate) (mass basis) in the cement component (or the combination of cement components), such as at least about 1.2×, at least about 1.3×, at least about 1.5×, at least about 1.7×, or at least about 2×, and up to about 3× or more, up to about 4× or more, or up to about 5× or more.

Once reacted, a resulting cement composition of some embodiments can be used as a cementitious binder and further processed, such as by curing. For example, water-curing can be carried out to promote hydration reactions to form a resulting cement product. In some embodiments, the binder can be mixed or otherwise combined with aggregates and then cured to form a concrete product, and, in some embodiments, the binder can be mixed or otherwise combined with cement clinker, such as OPC clinker, thereby serving as a cement replacement material. Examples of suitable aggregates include sand, gravel, crushed stone, slag, recycled concrete, and so forth. To address any impact on strength, a concrete product can be formed by precasting or other molding technique, yielding precast concrete components such as wall panels, beams, columns, slabs, cinder blocks, bricks, sidewalks, and so forth.

In some embodiments, the reaction of a cement component (or a combination of cement components) with liquid or supercritical $CO_2$ yields cementation, without requiring further curing to form a cement product. For example, the cement component (or the combination of cement components) can be mixed or otherwise combined with aggregates and then exposed to and reacted with liquid or supercritical $CO_2$ to form calcium carbonate, which can form around and between the aggregates to bind the aggregates to one another in a resulting concrete product. In the case of portlandite, for example, such cement component can be reacted, along with aggregates, in the form of a slurry by mixing with water. Binding agents can be added to improve the quality of cementation in some embodiments.

Example

The following example describes specific aspects of some embodiments of this disclosure to illustrate and provide a description for those of ordinary skill in the art. The example should not be construed as limiting this disclosure, as the example merely provides specific methodology useful in understanding and practicing some embodiments of this disclosure.

Overview:

This example examines the carbonation of portlandite $(Ca(OH)_2)$ by carbon dioxide $(CO_2)$ in the liquid and supercritical states as a route toward $CO_2$-neutral cementation. Portlandite carbonation is noted to be rapid; for example, >about 80% carbonation of $Ca(OH)_2$ is achieved in 2 h upon contact with liquid $CO_2$ at ambient temperatures, and yields consistent results with respect to the effects of temperature, pressure, and the state of $CO_2$ over the range of 6 MPa$\leq p \leq$10 MPa and $8°$ C.$\leq T \leq 42°$ C. Additional studies indicate that the carbonation of anhydrous ordinary portland cement is slower and somewhat less consistent than that of portlandite. Although cementation is not directly assessed, detailed scanning electron microscopy (SEM) examinations of carbonated microstructures indicate that the carbonation products formed encircle and embed sand grains similar to that observed in lime mortars. The outcomes indicate innovative directions for carbon-neutral cementation.

Introduction:

The carbonation of portlandite ($Ca(OH)_2$) is of interest for various reasons, including cementation action provided by both ancient and modern lime mortars, $CO_2$ sequestration by carbonaceous mineral formation, the synthesis of phase pure calcite for use in medical applications, the degradation of hydrated cement used in well-bore plugs for $CO_2$ storage applications, and embedded steel rebar corrosion in reinforced concrete structures resulting from the pH decrease that accompanies the loss of the $Ca(OH)_2$ buffer. Although the carbonation of portlandite in air and $CO_2$ can occur, fewer studies have examined carbonation processes where $CO_2$ can exist as a liquid or supercritical fluid. This is important, as in contrast to the carbonation of $Ca(OH)_2$ in gaseous $CO_2$, the interaction of $Ca(OH)_2$ with $CO_2$ in either the liquid or supercritical states allows for significantly accelerated conversion to $CaCO_3$.

The production of ordinary portland cement (OPC), the main binding component in concrete, accounts for about 7% of annual anthropogenic $CO_2$ emissions. Such $CO_2$ release is attributed to factors including (i) the energy requirements of clinkering the raw materials at about 1450° C. and (ii) the release of $CO_2$ during the calcination of limestone. Therefore, there is significant interest in reducing the carbon footprint of concrete. One approach involves the sequestration of emitted $CO_2$ in hydrated cement phases. This involves the carbonation of mature, hardened concrete microstructures, by contacting cured specimens with either liquid or supercritical carbon dioxide. Although carbonation is possible due to its operation under diffusive controls with progressive pore-blocking, the extent of carbonation that occurs over realistic time scales is small. Direct carbonation (carbonation in the absence of intentionally added liquid water) of anhydrous cement, however, has been less studied.

Alternatively, rather than relying on the retarded, diffusion-controlled carbonation of hydrated cement phases or on the anhydrous constituents, it can be more expedient to first decarbonate limestone to form lime (CaO) and to capture and provision the resulting emitted $CO_2$ in a fluid state (a liquid or supercritical state). Subsequently, the lime can be contacted with water to form hydrated or slaked lime (portlandite in the form of a powder or slurry), which can serve as a binder, for example, in the style of lime mortars. Portlandite monoliths (e.g., shaped as a structural element: a beam, a column, or a slab) produced by digital casting or by 3D-printing can in turn be contacted with the $CO_2$ captured during the decarbonation of limestone to once again form limestone (calcite). The premise of this approach is to close the $CO_2$ loop from manufacture to reuse. The volume increase that evolves through the carbonation process, and the use of consolidating additives (e.g., soluble phosphates and TEOS) can be exploited to form dense, monolithic prefabricated sections with potential uses in Lego-style "green construction". This approach is attractive because (i) it can be accomplished at comparatively low temperatures because limestone decarbonates at about 750° C. under ambient pressure, (ii) it ensures the near complete reuse of emitted $CO_2$, albeit at the cost of providing the captured $CO_2$ in either the liquid or supercritical state during the $CO_2$ mineralization process.

On the basis of the use of liquid and supercritical $CO_2$, in lieu of atmospheric (gaseous) $CO_2$, this example examines reaction parameters, including the reaction time, temperature, and pressure, and their influences on the carbonation of $Ca(OH)_2$ in the absence of intentionally added liquid water. Special focus is paid to elucidate the impact of the state of $CO_2$ (liquid or supercritical) on carbonation. Given the commonality of the CaO-based backbone of both portlandite and the anhydrous calcium silicate phases ($Ca_3SiO_5$ and $\beta$-$Ca_2SiO_4$) present in OPC, the potential for direct carbonation of OPC is also examined. The outcomes provide insights for methods for closed-loop $CO_2$ capture and utilization ($CO_2$ mineralization) during the production and fabrication of building materials and structural elements.

Materials:

Carbon dioxide with a purity of >99% (volume basis) was extracted from a pressurized reservoir maintained at 20 MPa using a siphon and used in all of the carbonation experiments. Analytical reagent grade calcium hydroxide ($Ca(OH)_2$) was used as a reactant. Thermogravimetric analysis of the $Ca(OH)_2$ indicated that it contained >about 98% $Ca(OH)_2$ by mass with the residual mass being comprised of $CaCO_3$. A Type I/II ordinary portland cement (OPC) produced by Lehigh-Hanson was also used. The mass-based mineralogical composition of the OPC as determined by X-ray diffraction with quantitative Rietveld analysis indicated that it contained about 56.5% $Ca_3SiO_5$, about 18.0% $Ca_2SiO_4$, about 11.4% $Ca_4Al_2Fe_2O_{10}$, about 6.3% $Ca_3Al_2O_6$, and about 4.6% calcite ($CaCO_3$).

Experimental Methods:

Particle Size Distributions (PSDs).

The particle size distributions (see FIG. 1) of the calcium hydroxide and OPC were measured using a Beckman Coulter Light Scattering Analyzer (LS13-320) fitted with a 750 nm laser source. Sonication in isopropanol was used to disperse the powders to primary particles. The highest uncertainty in the light scattering analysis was determined to be about 6% based on measurements performed on six replicates. The refractive indices and density of the $Ca(OH)_2$ and OPC were assumed to be ($n_{Ca(OH)2}$=1.574+0.000i, $\rho_{Ca(OH)2}$=2211 kg/m$^3$) and ($n_{OPC}$=1.700+0.010i, $\rho_{OPC}$=3150 kg/m$^3$).

Thermogravimetric Analysis (TGA/DTG).

Thermal analysis was carried out on the anhydrous and product phases for all carbonation treatments considered. A PerkinElmer STA 6000 simultaneous thermal analyzer (TGA/DTG/DTA) with a Pyris data acquisition interface was used to characterize the solid phases. The temperature and the mass sensitivity of the analyzer used were 0.25° C. and 0.1 µg, respectively. The powder samples were heated under ultra-high purity (UHP)-$N_2$ purge at a flow rate of about 20 mL/min and heating rate of about 10° C./min in pure aluminum oxide crucibles over a temperature range of about 35-975° C. The weight loss (TG) and differential weight loss (DTG) patterns acquired were used to identify the solid phases that were present, for example, the calcium hydroxide ($Ca(OH)_2$), calcium carbonate (calcite, $CaCO_3$), and the loss upon ignition of the anhydrous reactants. Such phase quantifications were carried out on three replicate samples. The maximum uncertainty in the phase quantifications, assessed based on three replicates, was on the order of ±2-5%.

X-ray Diffraction (XRD).

Qualitative X-ray diffraction analysis was carried out on the anhydrous and product phases following each carbonation treatment using a Bruker-D8 Advance diffractometer in a $\theta$-$\theta$ configuration using Cu K$\alpha$ radiation ($\lambda$=1.54 Å). The powder samples were scanned on a rotating stage between about 5 and about 70° (2$\theta$, degrees) in continuous mode with an integrated step scan of about 0.021° (2$\theta$) using a VANTEC-1 detector. The total time for the acquisition of an X-ray diffraction pattern was about 11 min. A fixed divergence slit of about 1.00° was used during the X-ray data acquisition. The potential for preferred orientation was minimized by using a fine powder and texturing the powder surface to induce small imperfections. A rotating sample holder was used to acquire statistically representative results. X-ray structure information for relevant phases was sourced from the literature or standard databases.

Scanning Electron Microscopy (SEM).

The surface morphology of the pristine and carbonated particulates was examined using a field emission-scanning electron microscope provisioned with an energy dispersive X-ray spectroscopy detector (SEM-EDS; FEI NanoSEM 230). SEM imaging was carried out on particles in high-vacuum mode (p of about $10^{-7}$ Torr) using secondary electrons. The particulates were gold-coated to facilitate charge dissipation. A spot size ($d_p$) of about 2.5-5.0, an accelerating voltage of about 7-15 kV, and a count time of about 600 s were used across all the imaging and spectroscopy routines.

Thermodynamic Calculations.

Figure 2:
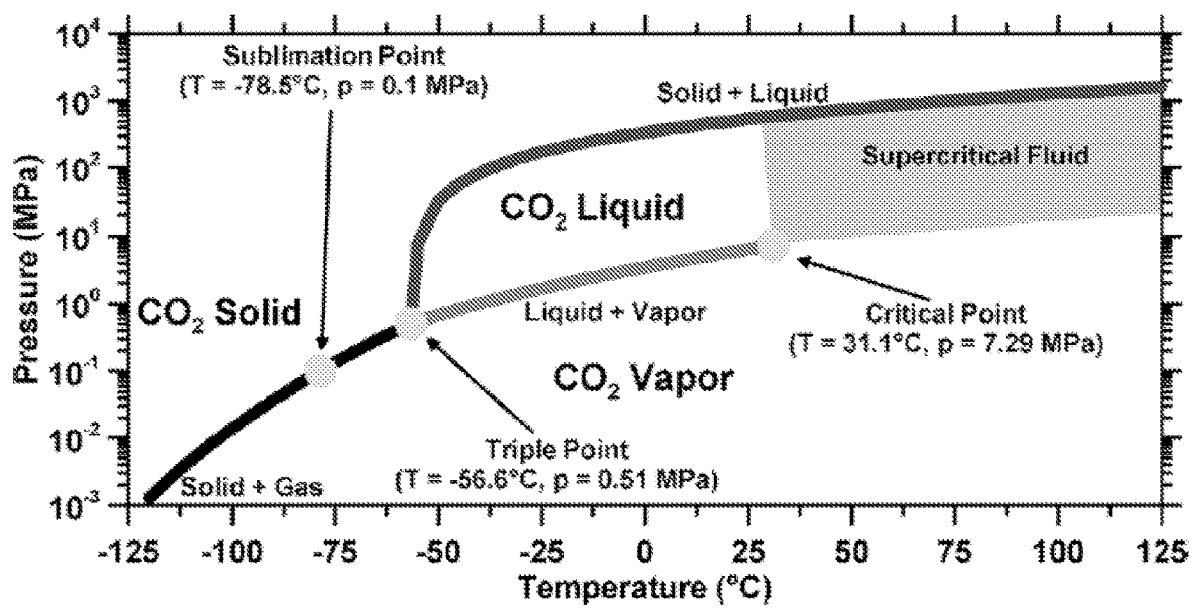
FIG. 2. Phase diagram of carbon dioxide ($CO_2$) showing the stability fields of the solid, liquid, and vapor states, including the critical point after which a supercritical fluid exists.

Calculations were carried out using Gibbs Energy Minimization Software (GEMS-PSI). GEMS-PSI is a geochemical modeling code that uses Gibbs energy minimization criteria to compute equilibrium phase assemblages of a complex chemical system from its total bulk elemental composition. GEMS applies a convex programming approach using an Interior Points Method in conjunction with data of the thermodynamic properties of phases (solid, liquid, and vapor) to calculate the phase balances. Chemical interactions between solids, solid-solutions, and solvent are considered simultaneously. The thermodynamic properties of the solids were sourced from the GEMS-PSI/NAGRA database and amended with additional data relevant to the present systems. The thermodynamic modeling was performed for systems carbonated in liquid $CO_2$ or $CO_2$ in the supercritical state (FIG. 2 shows p and T conditions). The calculations were carried out so as to account for the partial or stepwise carbonation of the reactants.

Details of $CO_2$ Reactor and Carbonation Treatments:

A high pressure reactor (HPE Model MS-17) manufactured by High Pressure Equipment with an internal volume of about 41 mL was used. The reactor was connected to a pressurized $CO_2$ source using high pressure tubing with a manual in-line pressurization system used to adjust the pressure within the reactor at the start of the experiment. The pressure and the temperature within the reactor were monitored at the outlet using a pressure gauge and a type-K thermocouple. The temperature conditions within the reactor were adjusted using a custom copper tubing-based heat exchanger connected to a programmable heater/chiller with a NIST-traceable temperature calibration. If desired, ice or a heat gun was used to quickly lower or to raise the reactor temperature to the desired value. To prevent any particulates from escaping the reactor, a 1-µm disk filter was attached at the outlet.

All carbonation experiments were carried out as follows:

(i) The reactor components were assembled, and the filter media and particulate sample were inserted therein.

(ii) Liquid $CO_2$ slowly filled the reactor while air was flushed from the reactor.

(iii) The pressure and temperature conditions were adjusted to desired values, and the setup was maintained as-is for the desired contact time of $CO_2$ (in the liquid or supercritical state) with $Ca(OH)_2$ or OPC being used as the reactant.

(iv) At the end of the experiment, the $CO_2$ was gently exhausted from the reactor, following which the reactor was disassembled, and the powder sample was retrieved.

The time that elapsed between operations (ii) and (iii) ranged between about 5 and about 10 min with longer equilibration times to achieve temperature conditions removed from ambient conditions and shorter times for those closer to ambient conditions. The time of carbonation as marked in this example includes the time that has elapsed between operations (iii) and (iv). It should be noted that once the desired conditions (p, T) were achieved in the reactor at the start of the experiment, repressurization, namely the reinjection of $CO_2$ into the reactor, or any other adjustments were not needed in this example.

For the influence of the state of the $CO_2$, pressure, temperature, and reaction time to be investigated, the anhydrous particulates were carbonated at pressures of 6, 8, and 10 MPa and at temperatures of 8, 18, 25, 32, 37, and 42° C. The liquid-solid ratio (l/s, $CO_2$-to-reactant, volume basis) used was on the order of about 25. The uncertainty in the pressure and temperature within the reactor was on the order of ±0.5 MPa and ±1° C., respectively. The maximum reaction time was fixed at 2 h as the reactor was noted to hold pressure most uniformly over this duration and by following observations of (liquid, supercritical) $CO_2$ contact times. The phase diagram for $CO_2$ is presented in FIG. 2; it is noted that the pressure and temperature combinations investigated in this example include $CO_2$ contact in the densified vapor, liquid, and supercritical states.

Direct Carbonation of Calcium Hydroxide (Portlandite):

From a thermodynamic (equilibrium) perspective, the carbonation of portlandite ($Ca(OH)_2$) proceeds as outlined in eq 1. Therefore, for every 1 g of $Ca(OH)_2$ that carbonates, 1.35 g of $CaCO_3$ is produced. Although the start and end states are well-defined (when carbonation is complete), the rate at which the reaction proceeds is a function of parameters, including temperature, pressure, and the presence of water. Moreover, depending on the presence of liquid water, namely whether carbonation is dissolution-precipitation mediated or not (rather than facilitated by the presence of adsorbed water), metastable products, such as amorphous calcium carbonate (ACC), or the other $CaCO_3$ polymorphs (vaterite or aragonite) may form before their subsequent conversion to calcite, which is noted as the stable end-state product.

The carbonation reaction is thought to involve water, for example, in the form of water vapor adsorbed on the solid or as a liquid to initiate carbonation. However, once initiated, the reaction is self-sustaining as the chemical transformation of portlandite to calcite releases water (eq 1). In the absence of externally added liquid water but in the presence of water that is adsorbed on solid surfaces, when exposed to liquid or supercritical $CO_2$, portlandite carbonates directly and rapidly to produce a coating of calcite on the $Ca(OH)_2$ grains. The passivating effect of this calcite coating appears to be small, providing at least four monolayers of adsorbed water are initially present. Depending on the conditions of interest, and the duration of carbonation, different morphologies of $CaCO_3$ crystals (rhombohedral, scalenohedral, and so forth) are noted to form, though the correlation between crystal morphology and the reaction conditions is complex and depends on whether the reaction conditions are sub/super-stoichiometric or stoichiometric.

$$Ca(OH)_2 + CO_2 \xrightarrow{water} CaCO_3 + H_2O \quad (1)$$

The experiments carried out in this example involve exposure to substantially pure $CO_2$ in the absence of externally added liquid water. As such, any water present is that adsorbed on the surfaces of the reactant ($Ca(OH)_2$) particles or that in any air that may remain in the reactor (denoted as "water" on the reaction progress arrow in eq 1). Following the phase diagram of water, any water that is released over the course of the carbonation would condense and would thus contribute to the catalytic progression of carbonation. An ambient water content >8% relative humidity (RH) would have been expected for the carbonation of $Ca(OH)_2$ to proceed at near ambient temperature conditions. This may also indicate that carbonation as is observed in this example (in the presence of primarily or solely adsorbed water) does not follow the traditional pathway of a dissolution-precipitation reaction, where species dissolve into and products form out of solution.

Figure 3:
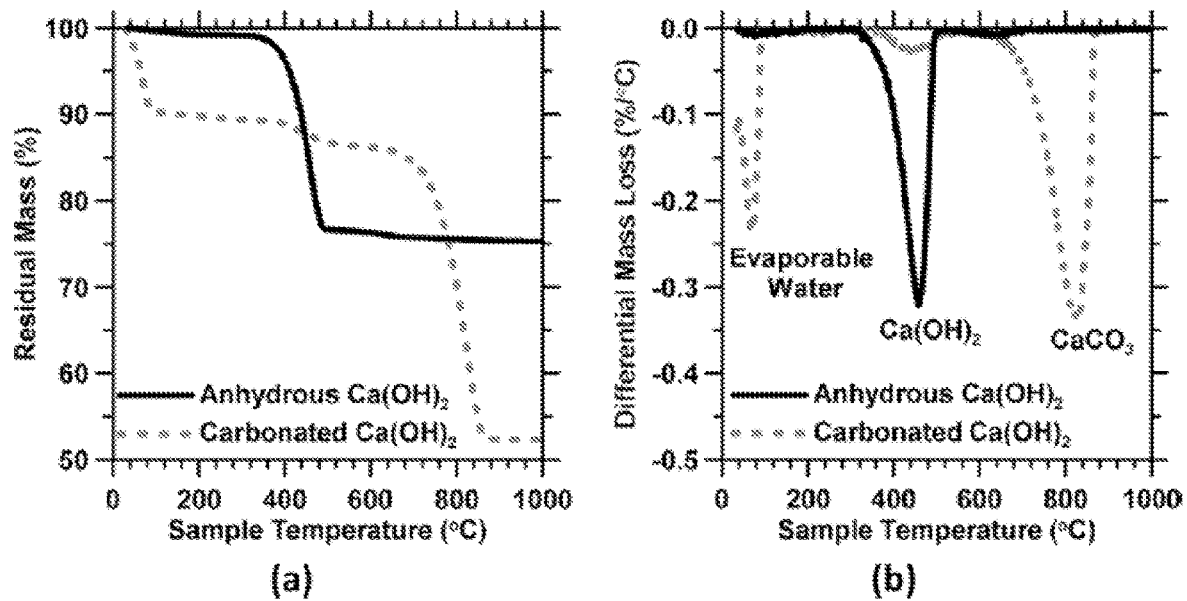
FIG. 3. Thermogravimetric analysis (TGA) traces showing (a) mass loss and (b) differential mass loss of pure calcium hydroxide and calcium hydroxide carbonated at 25° C. and 8 MPa for 2 h. Labeled on the differential mass loss traces are the decomposition peaks corresponding to evaporable water, $Ca(OH)_2$, and $CaCO_3$ (limestone or calcite). The highest uncertainty in the TGA quantifications is on the order of ±5%.

FIG. 3 shows representative mass loss and differential mass loss (DTG) curves for anhydrous and carbonated $Ca(OH)_2$ following 2 h exposure to $CO_2$ at 25° C. and 8 MPa of pressure. Three mass loss regions corresponding to evaporable water, the dehydroxylation of portlandite, and the decarbonation of calcite are noted at peak temperatures of about 110, about 420, and about 820° C., respectively. With knowledge of the decomposition reactions, the mass and mass fractions of phases initially present and those formed over the course of any carbonation treatment can be determined. It is noted that calcite is the primary or sole $CaCO_3$ phase that is observed (see also FIG. 4) with none of the other $CaCO_3$ polymorphs or ACC being observed across all carbonation treatments and (p, T) conditions considered.

Figure 4:
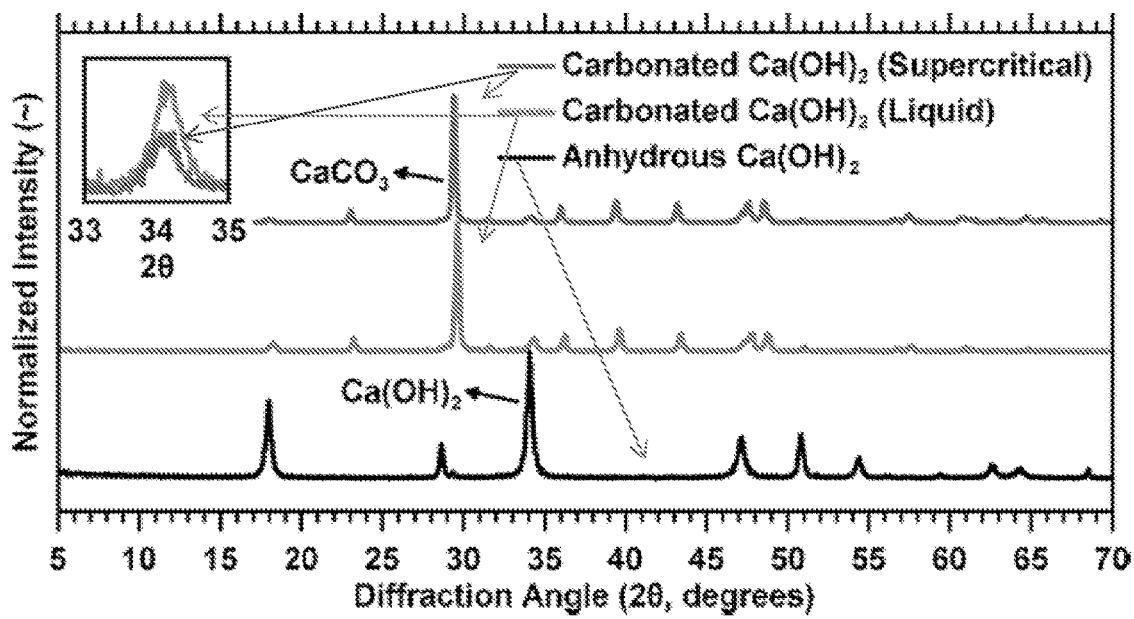
FIG. 4. Normalized X-ray diffraction patterns of $Ca(OH)_2$ before and after its carbonation in liquid or supercritical $CO_2$. The principal diffraction peaks of $Ca(OH)_2$ and $CaCO_3$ are labeled. The carbonation treatments shown correspond to liquid $CO_2$ (at 8 MPa and 25° C. for 2 h) and supercritical conditions (at 8 MPa and 32° C. for 2 h). The figure inset compares normalized residual $Ca(OH)_2$ peaks resulting from supercritical and liquid $CO_2$ carbonation.
Figure 5:
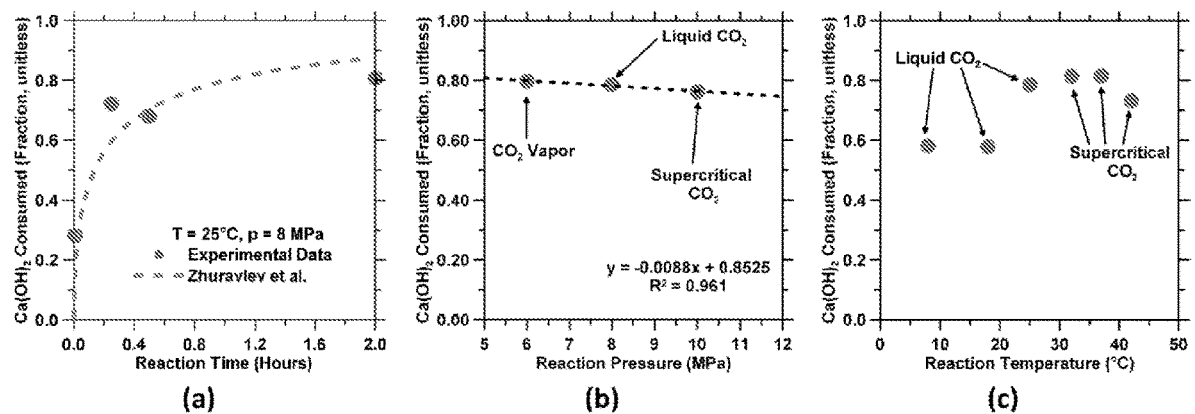
FIG. 5. Influence of experimental parameters on portlandite carbonation as quantified using TGA. (a) The influence of reaction time for carbonation carried out at T=25° C. and p=8 MPa, namely in liquid $CO_2$. The maximum uncertainty in the reaction time recorded was on the order of ±5 min. The dotted line shows a fit to the experimental data using the model of Zhuravlev et al. using a reaction rate constant of k=0.5 h$^{-1}$. This model, which was noted to best-fit the data, considers that the reactant activity decreases with increasing reactant consumption. (b) The influence of reaction pressure for carbonation carried out at T=25° C. for a reaction time of 2 h. (c) The influence of reaction temperature for carbonation carried out at p=8 MPa for a reaction time of 2 h. The highest uncertainty in the TGA quantifications is on the order of ±5%.

FIG. 4 shows normalized X-ray diffraction (XRD) patterns for the anhydrous and carbonated samples. In agreement with the TGA quantifications, the XRD patterns indicate that carbonation results in the formation of calcium carbonate, and specifically, its calcite polymorph. The residual peaks of $Ca(OH)_2$ noted indicate its incomplete carbonation. A smaller residual peak for $Ca(OH)_2$ is observed in the case of supercritical carbonation vis-à-vis liquid $CO_2$ carbonation (see inset to FIG. 4), in agreement with the TGA quantifications (FIG. 5c), indicating that $CO_2$ in the supercritical state ensures more accelerated carbonation (FIG. 5c). Qualitatively, no notable differences are observed between samples carbonated in liquid $CO_2$ (at 8 MPa and 25° C. for 2 h) and in supercritical conditions (at 8 MPa and 32° C. for 2 h), indicating that the state of $CO_2$ does not appear to heavily influence the end-points of eq 1, or the specific polymorph of $CaCO_3$ that is formed, over similar time scales of interest.

A series of experiments were carried out while varying the reaction time, pressure, and temperature to understand how these parameters may influence the kinetics of carbonation. First, to study the effects of reaction time, a series of experiments were carried out for different residence times of $CO_2$ wherein p=8 MPa and T=25° C. The results of such determinations, shown in FIG. 5a, indicate that (i) carbonation kinetics are rapid with about 30% of the portlandite initially present being consumed within the first few minutes, and (ii) about 80% of the portlandite being consumed (carbonated) after a $CO_2$ contact time of 2 h. Extrapolation of a model of Zhuravlev et al. and a logarithmic trend fitted to the data indicate that substantially the entire quantity of $Ca(OH)_2$ present would be carbonated after about 5.2 h of contact with $CO_2$. This indicates that the formation of calcite on the surfaces of $Ca(OH)_2$ grains (FIGS. 5a and 6a), although capable of decreasing the reaction rate, does not result in surface passivation, at least for short reaction times (t≤2 h). As such, the reaction is proposed to follow two stages: (i) initially, the reaction is interface-controlled, that is, it depends on the specific surface area of the grains, and (ii) at longer times (t>2 h), the reaction is diffusion-controlled, that is, the rate limiting step is that which controls the diffusion of $CO_2$ through the topical $CaCO_3$ crystals that form on the surface of portlandite grains (FIG. 6a). At the atomic scale, the mechanism of such diffusion is likely to involve the transport of elemental C and O species, resulting in the formation of intermediate point defects, rather than via the transport of intact $CO_2$ molecules.

Because stage (i) occurs over a short time scale, systematic analysis of the kinetic data was carried out by applying different diffusion-controlled models, as relevant for stage (ii). Among the different models considered, the model of Zhuravlev et al., which takes the form $k_z t=[(1-\alpha)^{-1/3}-1]^2$, offered the best-fit, where t is the reaction time in hours, $k_z$ is the reaction rate constant (units of $h^{-1}$), and $\alpha$ denotes the extent of the reaction, which ranges between [0,1]. This model assumes instantaneous surface nucleation, such that the solid reactant is separated from the surrounding liquid by a boundary layer, while the overall process remains diffusion-controlled. This model can be used to capture the kinetics of solid/fluid reactions.

It is noted that analysis of eq 1 indicates that the molar volume of the solid product ($CaCO_3$) is about 10% higher than that of the anhydrous solid reactant. This may result in the exfoliation of initially formed $CaCO_3$ surface layers due to surface volume expansion), which in turn would facilitate the inward penetration of the carbonation front deeper into portlandite grains by terracing. Indeed, such terracing is observed on carbonated portlandite surfaces (see FIG. 6a). As such, rate controls on carbonation appear to be related to two phenomena, namely diffusive transport and the potential exfoliation of any physical barriers ($CaCO_3$ layers) that may otherwise retard the progress of the reactions. In addition to their irregular growth and their non-uniform morphological structure, this is another reason why calcite films formed on portlandite surfaces may be non-passivating.

Water has been noted to serve as a catalyst for carbonation. In the absence of water, bare CaO surfaces are very reactive as the oxygen-terminating atoms on their surfaces spontaneously react with $CO_2$ molecules to form $CO_3^{2-}$ units. However, such a reaction is self-limiting and thereby typically stops after one monolayer of product is formed. However, when present, the polar water molecules induce the removal of $Ca^{2+}$ ions from the solid $Ca(OH)_2$. Calcium ions then react with $CO_2$ molecules to form carbonate complexes. As such, the reaction proceeds by $OH^-$-for-for-$CO_3^{2-}$ exchange with the rate limiting step being the inward diffusion of the $CO_2$ molecules and the outward diffusion of $OH^-$, in the slow carbonation regime. It is noted that such observations of stepwise surface exfoliation and ion-exchange indicate a topochemical origin of direct carbonation. Following expulsion, OH groups can recombine with $H^+$ to form liquid water (see also FIG. 3, which shows the evolution of liquid water following carbonation) as is indicated in eq 1.

Next, the effects of reaction temperature and pressure were studied for a fixed reaction (contact or residence) time of 2 h. It is noted that, at the highest pressure (10 MPa) and the lowest and highest temperatures (8 and 42° C., respectively) evaluated, the time to establish desired experimental conditions was somewhat delayed as compared to lower pressures and near ambient temperature conditions. Given the fast reaction kinetics noted in FIG. 5a, such delays may slightly influence the results. First, FIG. 5b shows the influence of pressure on Ca(OH)$_2$ carbonation for 6 MPa≤p≤10 MPa. It is noted that, broadly, pressure slightly influences the extent (and thus the rate) of carbonation (within the range considered) despite the change in the state of CO$_2$ across the densified vapor (6 MPa), liquid (8 MPa), and supercritical fluid (10 MPa) boundaries. The results indicate that carbonation reactions show little rate dependence on the reaction pressure, described by an activation volume relation ($\Delta V_R$=RT[d ln(k)/d ln(p)], where R is the ideal gas constant, k is a reaction progression parameter, and $\Delta V_R$ is the activation volume with units of cm$^3$/mol, FIG. 7a). Analysis of FIG. 7a yields a $\Delta V_R$=27.3 cm3/mol, an activation volume that is about 1.51× that of water. It is noted that the activation volume concept is applied despite the different states of the fluid reactant (CO$_2$) present while assuming that the start and end states of the reaction, as shown in eq 1, remain unchanged and that no significant metastable products form. As such, the effects of pressure and the state of CO$_2$ (if relevant) are both convoluted within the activation volume relation.

Figure 7:
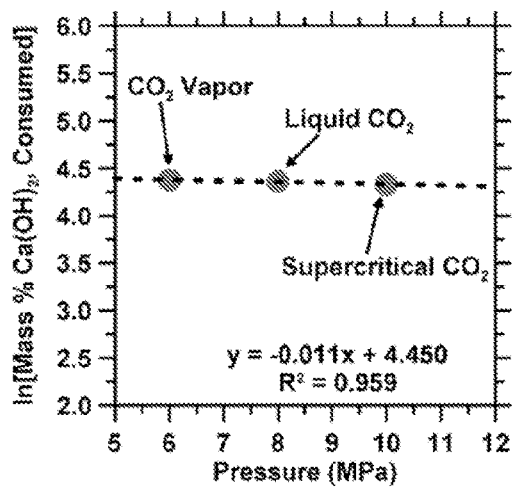
FIG. 7. (a) An activation volume relation, which elucidates the influence of pressure on the rate of the carbonation reaction. The slope of a linear fit to the data set reveals m=d ln(k)/dp, namely the activation volume of the reaction, $\Delta V_R$=−27.3 cm$^3$/mol. The data points correspond to a reaction time of 2 h for T=25° C. (b) An Arrhenius plot of the natural logarithm of the quantity of portlandite consumed as a function of the inverse of the reaction temperature. The slope of a linear fit, where m=d ln(k)/d ln(1/T), to the data reveals the activation energy of the reaction, $E_a$=7.5 kJ/mol, for a reaction time of 2 h at p=8 MPa.
Figure 7:
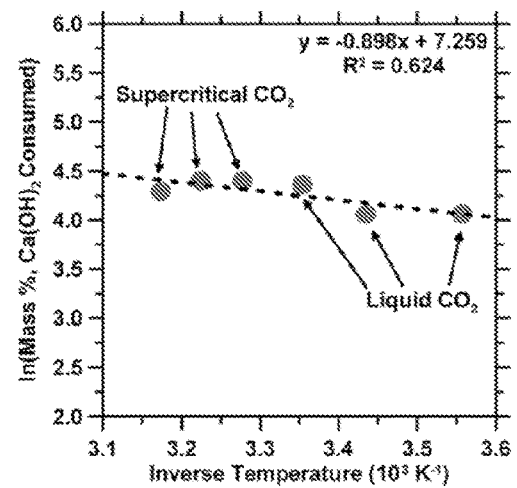

The reaction temperature is noted to have a more substantial effect on carbonation reactions, with lower temperatures generating a smaller extent of carbonation. As noted in FIG. 5c, two reaction regimes emerge corresponding to temperatures below and above 25° C. It is noted that, at the lower temperatures studied (8, 18, and 25° C.), carbon dioxide is in a liquid state, whereas at higher temperatures, it is in the supercritical state. Thus, although it may appear that the two-regime behavior is a function of the change in state of carbon dioxide, this may not be so, as the 25° C. treatment, which involves contact with liquid CO$_2$ in terms of its extent of carbonation, matches that achieved during supercritical conditions. More detailed analyses of the temperature effects are carried out by quantifying the activation energy of the carbonation reaction, which establishes rate dependence on temperature via an Arrhenius relation, $E_a$=R[d ln(k)/d ln(1/T)], where $E_a$ is the activation energy (kJ/mol). Analysis of such a relation, as shown in FIG. 7b, yields $E_a$=7.5 kJ/mol, indicative of a smaller dependence of the reaction rate on temperature (within the range considered). This value is in agreement with that quantified as $E_a$ of about 6 kJ/mol, via carbonation of portlandite in a thermogravimetric analyzer in the absence of water. However, the present value of the activation energy is about 4.5× smaller than that noted for the case of CaO carbonation, which may be because (i) diffusion limitations are more severe in the case of CaO carbonation due to improved passivity rendered by the surface carbonation products and (ii) because CaO carbonation is noted to initially produce a metastable CaCO$_3$ compound, which in time converts to the calcite polymorph. Although this analysis convolutes the effect of temperature and the state of CO$_2$, it is assumed to be appropriate given the order of magnitude similarity in the properties of CO$_2$ in the liquid and supercritical states. For example, the density and viscosity of CO$_2$ in the liquid state (8 MPa, 25° C.) are about 774 kg/m$^3$ and about 67.16 µPa s, respectively, whereas those in the supercritical state (8 MPa, 32° C.) are about 647 kg/m$^3$ and about 47.07 µPa s, respectively.

Direct Carbonation of Ordinary Portland Cement (OPC):

The premise of the direct carbonation process elucidated in this example is to mineralize, and thus lock-in CO$_2$ that is emitted during the decarbonation of limestone during the manufacturing of OPC (eqs 2 and 3). As such, similar to the case of portlandite discussed above, an OPC is directly contacted with CO$_2$ in the liquid or supercritical states. CO$_2$ is a substantially linear molecule, O=C=O (where "=" is a carbon double bond) and shows no significant directional bias in charge (CO$_2$ is nonpolar); hence, it typically cannot serve as a "solvent" into which the OPC phases would dissolve to promote the reactions. As such, similar to Ca(OH)$_2$, topochemical carbonation is involved, wherein the proximity of CO$_2$, in abundance, as a liquid or supercritical fluid is sufficient to promote carbonation reactions.

It is proposed that direct carbonation of OPC, similar to that of Ca(OH)$_2$, involves the replacement of a silicate, aluminate, or ferrite group bonded to Ca atoms in the OPC phases by a carbonate group. If thermodynamically permissible, this reaction pathway, which can be favored by the presence of water, can be generalized for Ca$_3$SiO$_5$ and Ca$_2$SiO$_4$ as noted in eqs 2 and 3 below, and similar pathways also can be applicable for Ca$_3$Al$_2$O$_6$ and Ca$_4$Al$_2$Fe$_2$O$_{10}$.

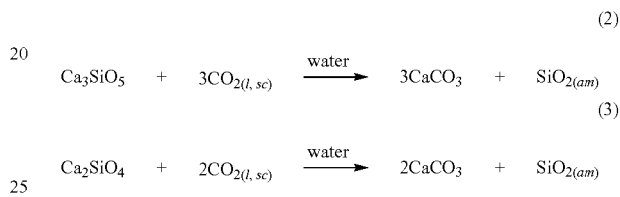

Figure 8:
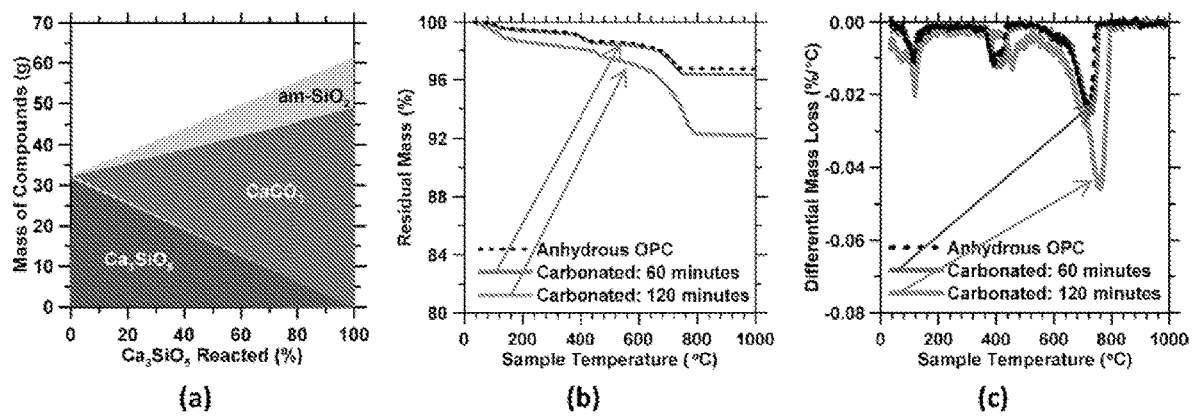
FIG. 8. (a) The volumes of phases calculated to form following the incremental reaction of 100 g of $Ca_3SiO_5$ with excess liquid $CO_2$ or supercritical $CO_2$ as a function of the incremental degree of reaction (carbonation) as determined by thermodynamic calculations (p=8 MPa, T=25° C.). No account is made for the state of $CO_2$. Because of the "equilibrium nature" of the calculations, no account is made for the period of time to achieve a given extent of carbonation. The calculation assumes the density of water, portlandite, and $Ca_3SiO_5$ as about 1000, about 2211, and about 3150 kg/m$^3$, respectively. Thermogravimetric traces: (b) TGA and (c) DTG of an OPC following its carbonation in liquid $CO_2$ for T=25° C. and p=8 MPa over different reaction times. The highest uncertainty in the TGA quantifications is on the order of ±5%.

In eqs 2 and 3, the subscripts "l", "sc", and "am" denote the liquid or supercritical states and amorphous nature, respectively, and "water" indicates that which is present in the adsorbed state on the solid. The reaction pathways noted above highlight that the silicate phases upon contact with CO$_2$ would form calcium carbonate and amorphous silica, namely a disordered silica compound, over the (p, T) conditions applied in this example (in general, 5 MPa≤p≤10 MPa and 5° C.≤T≤35° C.). This conclusion is supported by the thermodynamic calculations (see FIG. 8a).

For the direct carbonation of OPC, it was exposed to CO$_2$ in the liquid and supercritical states in the same fashion as that applied for portlandite. Some interesting results were observed (e.g., see FIGS. 8b and c), where it was noted that an increasing quantity of calcite formed as the duration of carbonation was extended, similar to that observed for Ca(OH)$_2$. The anhydrous OPC, which initially contained about 4.4% calcite and about 2.6% Ca(OH)$_2$ (by mass), showed a calcite content of about 11.9% (by mass) after 2 h of carbonation at 25° C. and 8 MPa. This calcite content, being above that associated with Ca(OH)$_2$ carbonation and the intrinsic calcite content of the OPC, indicates that there is potential for the direct carbonation of OPC, albeit at a rate slower than that of Ca(OH)$_2$. Some inconsistencies were noted in carbonation progression. For example, although in certain cases substantial carbonation occurred, in other cases, even for corresponding reaction parameters, little or no carbonation occurred. Given the importance of adsorbed water on the reaction progression, additional experiments were carried out on OPCs conditioned to a range of relative humidities (RH=about 50, about 75, and about 90%) in air for about 1 week. It is noted that the RH, and therefore adsorbed water content, on OPC surfaces influences OPC carbonation upon its exposure to CO$_2$ in the liquid or supercritical states. Thus, the results highlight that an OPC can be directly carbonated, although further optimization can be performed to comprehensively elucidate which parameters control the progression and repeatability of the direct carbonation process of the calcium silicates (and other phases) present in OPC.

Figure 9:
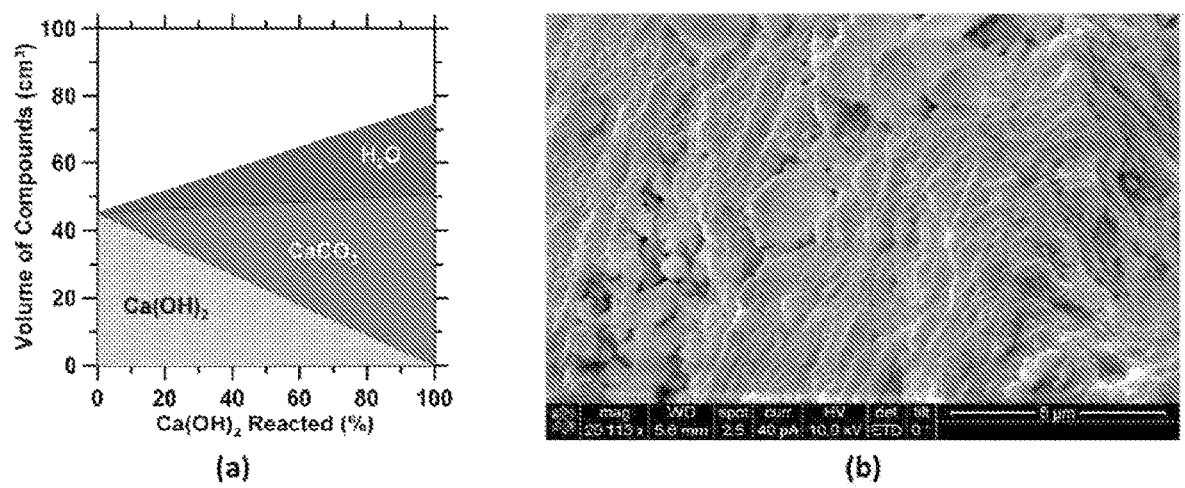
FIG. 9. (a) The volumes of phases calculated to form following the reaction of 100 g of $Ca(OH)_2$ with excess liquid $CO_2$ or supercritical $CO_2$ as a function of the incremental degree of reaction (carbonation) as determined by thermodynamic calculations (p=8 MPa, T=25° C.). No account is made for the state of $CO_2$. On account of the "equilibrium nature" of the calculations, no account is made for the period of time to achieve a given extent of carbonation. The calculation assumes the density of water, portlandite, and calcite as about 1000, about 2211, and about 2650 kg/m$^3$, respectively. (b) High-resolution micrographs acquired in secondary electron (SE) mode, which show the surface morphology of an OPC particle following its exposure to supercritical $CO_2$ (p=8 MPa, T=32° C.). Direct carbonation results in substantial terracing and stepwise exfoliation of the particles surface, which results in progressively deeper penetration of the carbonation front into the OPC grains.

Whether the Carbonation Reaction is Self-Arresting:

It is thought that the formation of a protective film of calcite on portlandite or OPC surfaces could further arrest the reaction. However, on the basis of the observations in this example, the direct carbonation reaction of neither $Ca(OH)_2$ nor OPC was noted to be self-arresting. This is postulated to be on account of (i) the presence of adsorbed water, and water released over the course of carbonation, which favors the advancement of the reactions, particularly in the case of portlandite (eq 1 and FIG. 9a) and (ii) the volume change that accompanies the carbonation process, which ensures that the volumes of the products are slightly (about 1.1× for $Ca(OH)_2$; FIG. 9a) or substantially (about 1.9× for $Ca_3SiO_5$) larger than that of the reactants, due to which expansion occurs. Although the smaller volume expansion resulting from $Ca(OH)_2$ carbonation is somewhat tolerated, resulting in surficial terracing, the dramatic increase in the solid volume during OPC carbonation results in dramatic exfoliation and spalling of surface layers (see FIG. 9b for exfoliation and terracing on OPC grains). Though terracing is seen on $Ca(OH)_2$ grains following their carbonation (see also FIG. 6), it is much less dramatic. Such terracing/exfoliation results in progressively deeper penetration of the carbonation front into the grains, ensuring that the carbonation reaction is not self-arresting. This indicates that, so long as suitable reaction conditions are provisioned, the direct carbonation of $Ca(OH)_2$ and OPC can progress substantially, if not to their completion.

Potential for Cementation:

To evaluate whether cementation can be ensured via direct carbonation, it is proposed that, similar to microbiologically induced calcite precipitation (MICP), which cements granular soils or seals cementitious cavities, or self-healing concrete and crack remediation applications, the processes outlined in this example can also produce cohesion in otherwise cohesionless (powder) materials.

Figure 6:
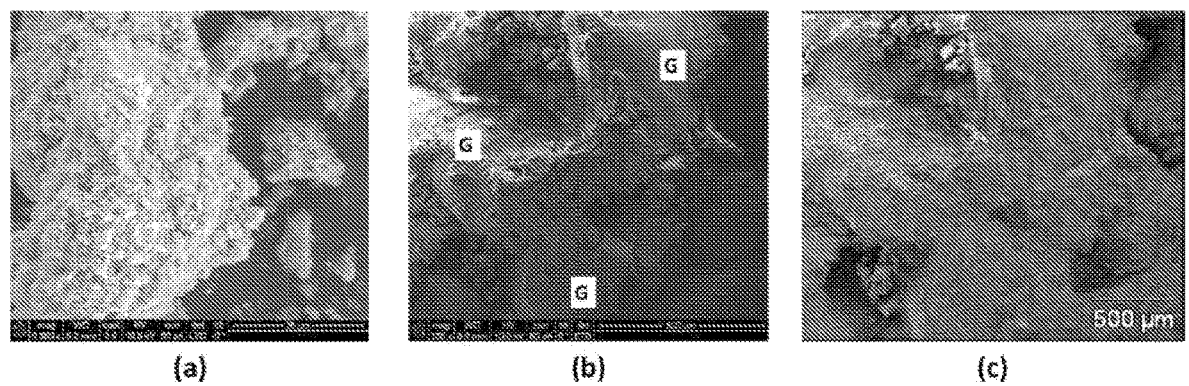
FIG. 6. (a) Micrograph showing surface calcite formation (identified by SEM-EDS analysis) and terracing on a $Ca(OH)_2$ grain. (b and c) Micrographs showing the formation of calcite between silica sand grains in a mixture composed of $Ca(OH)_2$/silica sand/water at a ratio of about 1.00:1.43:2.00 (by mass) that was exposed to liquid $CO_2$ at T=25° C. and p=8 MPa. The shaded region shows areas rich in calcium (Ca) and carbon (C), namely $CaCO_3$, following the carbonation of $Ca(OH)_2$. The carbonation product ($CaCO_3$) forms between and around silica sand grains (labeled "G"), indicating that direct carbonation can offer the potential for cementation in the manner of microbiologically induced calcite precipitation (MICP) or cementation provisioned by lime mortars.
Figure 10:
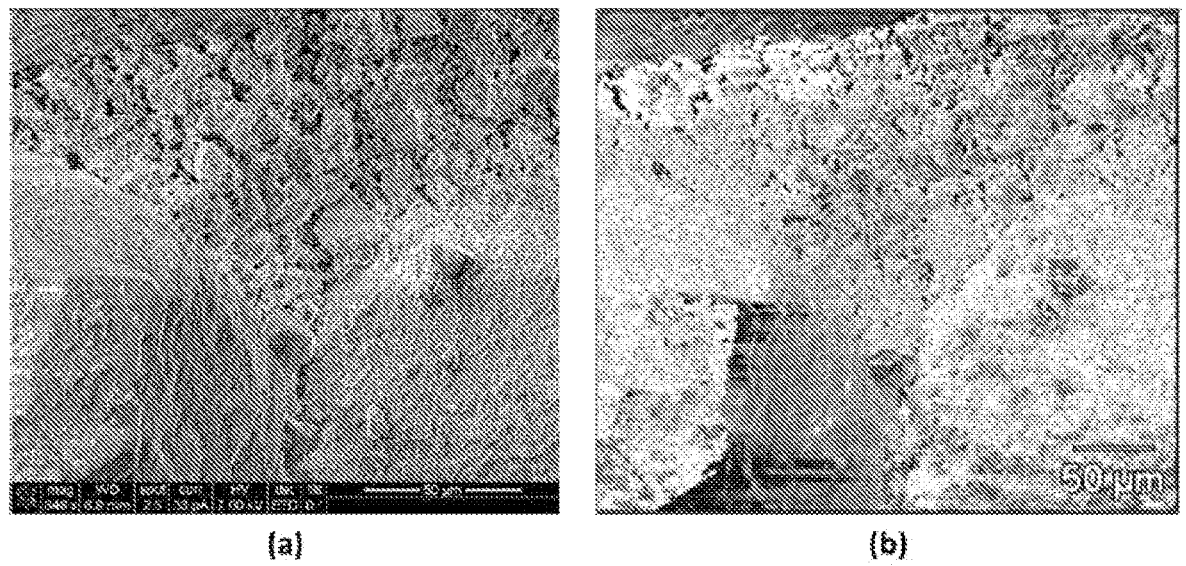
FIG. 10. (a) A secondary electron image of a mixture formed of silica sand and OPC following carbonation in liquid $CO_2$. (b) The shaded portion shows areas rich in calcium (Ca) and carbon (C), namely CaCO$_3$, following the carbonation of OPC. Such carbonation products (CaCO$_3$ and amorphous silica) are noted to form between and around silica sand grains (the large rounded forms at the bottom left and right of each image), indicating that direct carbonation can offer the potential for cementation in the manner of MICP.

Studies using OPC powder compacts, loose OPC powder, or slaked lime mixed with siliceous sand support the concept that cementation can be accomplished by direct carbonation (e.g., see FIGS. 6b and c and FIG. 10). To examine this possibility, first, an OPC pellet (r of about 1.0 cm, h of about 0.5 cm) was formed under high pressure (p of about 100 MPa), which was noted to retain its form and rigidity after direct carbonation in spite of the exfoliation of OPC particle surfaces. This is important as it indicates that the increase in volume accompanying carbonation is not violent enough to dismantle the cohesion of the powder compact. Second, the OPC powder and slaked lime ($Ca(OH)_2$ slurry) were separately mixed with fine silica sand and loosely filled in a container. This assembly was then exposed to liquid $CO_2$ to permit direct carbonation after which SEM-EDS examinations were carried out. As shown in FIGS. 6 and 10, these examinations highlight the formation of $CaCO_3$ (and amorphous silica when OPC is used, eqs 2 and 3) between and around the silica sand grains. This is similar to sand grains cemented by biological actions and in lime mortars, indicating that direct carbonation can be capable of ensuring cementation.

CONCLUSIONS

The development of carbon-neutral cementation routes is a grand-challenge of interest to the construction industry. The ability to capture $CO_2$ emitted during the calcination of limestone, and its potential reuse, is a desirable pathway to achieve this goal. Toward this end, this example has investigated reaction parameters including time, temperature, and pressure, and how they may influence the progress of $Ca(OH)_2$ carbonation under conditions of both liquid and supercritical $CO_2$ exposure. Careful examination of the reaction kinetics under a wide-variety of reaction conditions indicates that (i) the kinetics of portlandite carbonation in $CO_2$ in liquid and supercritical $CO_2$ are rapid and well-described by a diffusion-controlled model, (ii) the state of $CO_2$ (liquid or supercritical fluid) does not heavily influence the progression, namely the rate or extent of carbonation achieved, at least over the range of temperatures and pressures considered, and (iii) substantial carbonation can be achieved (>about 80% within 2 h), indicating that the $CaCO_3$ product layer formed on $Ca(OH)_2$ surfaces is largely non-passivating. Analysis of kinetic data is also used to identify the activation volume and activation energy of the carbonation reaction. It is noted that consistent results for the carbonation reaction rates were obtained with respect to both pressure and temperature variations within the ranges considered.

The carbonation of OPC was also examined following its exposure to liquid and supercritical $CO_2$. Although results are promising, further optimization can be performed to understand how the direct carbonation of OPC can be reliably carried out. Nonetheless, observations of carbonated OPC surfaces show very significant surficial exfoliation that can result from the molar volume increase that accompanies carbonation. Although cementation was not directly assessed (e.g., by analysis of mechanical properties), the carbonation of both $Ca(OH)_2$ and OPC in the presence of fine silica sand (in the form of a mortar) was observed to produce stable pellets, where carbonation products were observed to encompass and encircle the sand grains. These observations provide indications of the viability of this approach for the fabrication of carbon-neutral building materials and structural elements by analogy to lime mortar carbonation.

As used herein, the singular terms "a," "an," and "the" include plural referents unless the context clearly dictates otherwise. Thus, for example, reference to an object can include multiple objects unless the context clearly dictates otherwise.

As used herein, the term "set" refers to a collection of one or more objects. Thus, for example, a set of objects can include a single object or multiple objects.

As used herein, the terms "substantially" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can encompass a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

As used herein, the term "size" refers to a characteristic dimension of an object. Thus, for example, a size of an object that is circular can refer to a diameter of the object. In the case of an object that is non-circular, a size of the non-circular object can refer to a diameter of a corresponding circular object, where the corresponding circular object exhibits or has a particular set of derivable or measurable characteristics that are substantially the same as those of the non-circular object. Alternatively, or in conjunction, a size of a non-circular object can refer to an average of various orthogonal dimensions of the object. Thus, for example, a size of an object that is an ellipse can refer to an average of a major axis and a minor axis of the object. When referring to a set of objects as having a particular size, it is contemplated that the objects can have a distribution of sizes around the particular size. Thus, as used herein, a size of a set of objects can refer to a typical size of a distribution of sizes, such as an average size, a median size, or a peak size.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

While the disclosure has been described with reference to the specific embodiments thereof, it should be understood by those skilled in the art that various changes may be made and equivalents may be substituted without departing from the true spirit and scope of the disclosure as defined by the appended claims. In addition, many modifications may be made to adapt a particular situation, material, composition of matter, method, operation or operations, to the objective, spirit and scope of the disclosure. All such modifications are intended to be within the scope of the claims appended hereto. In particular, while certain methods may have been described with reference to particular operations performed in a particular order, it will be understood that these operations may be combined, sub-divided, or re-ordered to form an equivalent method without departing from the teachings of the disclosure. Accordingly, unless specifically indicated herein, the order and grouping of the operations is not a limitation of the disclosure.

What is claimed is:

1. A manufacturing process of a cement-based product, comprising:
    (a) combining at least one cement component that includes portlandite ($Ca(OH)_2$) with aggregates;
    (b) shaping the at least one cement component and the aggregates to form a monolithic structural element;
    subsequent to the shaping in (b),
    (c) disposing the monolithic structural element in a reactor;
    (d) exposing the monolithic structural element in the reactor to gaseous $CO_2$ to form a cement-based product,
    wherein the exposing in (d) includes converting portlandite to calcium carbonate, and
    wherein a partial pressure (concentration) of the $CO_2$ present in the reactor is higher than a partial pressure of $CO_2$ in ambient atmosphere.

2. The manufacturing process of claim 1, wherein the at least one cement component (feedstock) further includes calcium silicate hydrate or a limestone.

3. The manufacturing process of claim 1, wherein the at least one cement component further includes ordinary portland cement, a calcium sulfoaluminate cement, or a calcium aluminate cement.

4. The manufacturing process of claim 1, wherein the at least one cement component further includes magnesium hydroxide, magnesium carbonate, or magnesium silicate.

5. The manufacturing process of claim 1, wherein the exposing in (d) is carried out at a temperature in a range of about 5° C. to about 80° C.

6. The manufacturing process of claim 1, wherein the exposing in (d) includes converting the at least one cement component to calcium carbonate or magnesium carbonate.

7. The manufacturing process of claim 6, wherein a mass basis percentage of the at least one cement component converted to calcium carbonate or magnesium carbonate is at least 10% within a reaction residence time period of 6 h.

8. A manufacturing process, comprising:
    (a) disposing a reactant in a reactor, wherein the reactant is in a monolithic form and includes portlandite and aggregates, and a water content of the reactant mixture is no greater than 25% by mass;
    (b) introducing $CO_2$ into the reactor; and
    (c) exposing the reactant to gaseous $CO_2$ for a reaction time period to form calcium carbonate,
    wherein a partial pressure of the $CO_2$ present in the reactor is higher than a partial pressure of $CO_2$ in ambient atmosphere.

9. The manufacturing process of claim 8, wherein the water content of the reactant mixture is no greater than 20% by mass.

10. The manufacturing process of claim 8, wherein a mass basis percentage of the reactant converted to calcium carbonate is at least 10% within the reaction time period of 6 h.

11. The manufacturing process of claim 1, wherein the shaping in (b) includes forming pores to facilitate permeation of $CO_2$ in the structural element.

12. The manufacturing process of claim 1, further comprising disposing the structural element in an atmosphere with a relative humidity greater than 8%, and less than 75%, prior to the exposing in (d).

13. The manufacturing process of claim 1, wherein the exposing the monolithic structural element in the reactor to $CO_2$ in step (d) results in an accelerated carbonation rate relative to exposing the monolithic structural element in the reactor to ambient atmospheric air.

14. The manufacturing process of claim 8, wherein the exposing the monolithic structural element in the reactor to $CO_2$ in step (d) results in an accelerated carbonation rate relative to exposing the monolithic structural element in the reactor to ambient atmospheric air.

15. The manufacturing process of claim 1, further comprising exposing the structural element in an atmosphere with a relative humidity of about 30% or greater prior to the exposing in (d).

16. The manufacturing process of claim 1, cement component contains portlandite in an amount of at least about 80% by mass.

* * * * *